Oct. 2, 1956 F. CARTLIDGE 2,765,156
ROTARY BORING HEAD ASSEMBLY HAVING RADIAL ARMS
AND FORWARDLY PROJECTING CUTTER SUPPORTS
Filed June 1, 1954 4 Sheets-Sheet 2

INVENTOR.
Frank Cartlidge
BY
Murray A. Gleeson
ATTORNEY

Oct. 2, 1956 F. CARTLIDGE 2,765,156
ROTARY BORING HEAD ASSEMBLY HAVING RADIAL ARMS
AND FORWARDLY PROJECTING CUTTER SUPPORTS
Filed June 1, 1954 4 Sheets-Sheet 3

INVENTOR.
Frank Cartlidge
BY
Murray A. Gleeson
ATTORNEY

United States Patent Office 2,765,156
Patented Oct. 2, 1956

2,765,156

ROTARY BORING HEAD ASSEMBLY HAVING RADIAL ARMS AND FORWARDLY PROJECTING CUTTER SUPPORTS

Frank Cartlidge, Chicago, Ill., assignor to Goodman Manufacturing Company, Chicago, Ill., a corporation of Illinois Application June 1, 1954, Serial No. 433,566

2 Claims. (Cl. 262—7)

This invention relates to improvements in mining machines of the boring type especially adapted to cut a bore in advance of the machine. A well-known form of such boring machines is provided with a pair of laterally spaced boring heads, each with a plurality of radial arms, adapted to cut contiguous bores in the working face, and also having auxiliary horizontal upper and lower cutter bars disposed immediately behind the boring heads for trimming the circular bore pattern to produce flat roof and floor surfaces.

Boring heads of the kind above mentioned are usually provided with a plurality of forwardly projecting bit-carrying cutter suports mounted in spaced relation along each radial arm of the head, the arms having the same number and spacing of cutter supports so as to produce a limited number of circular kerfs in the working face, and leaving outstanding cores of mineral between adjacent kerfs, to be dislodged in relatively large lumps by suitable breaker devices also carried by the boring head.

Among the objects of the present invention is to provide an improved boring arm construction for detachably mounting the cutter supports on the radial arms of the boring head to insure the required strength and ruggedness for cutting devices of this type.

Other objects of the invention will appear from time to time as the following description proceeds.

The invention may best be understood by reference to the accompanying drawings, in which.

Figure 1:
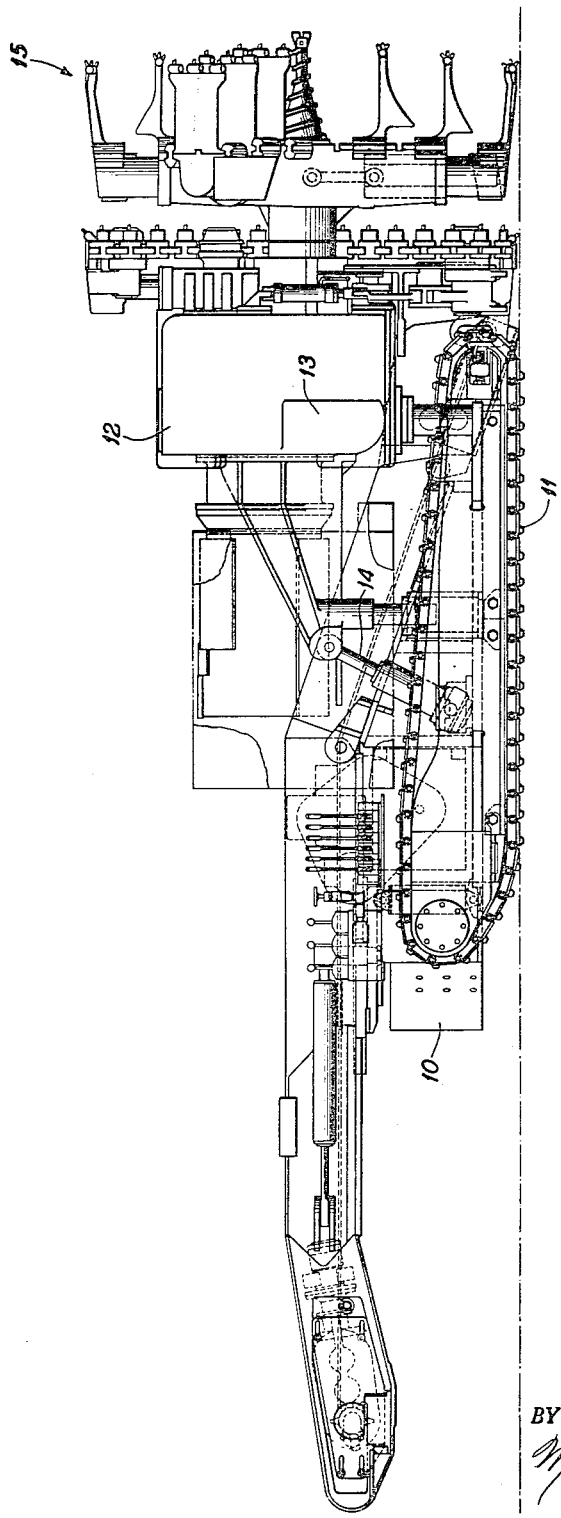
Figure 1 is a side view of a mining machine having a boring head constructed in accordance with the present invention.

Referring now to details of the embodiment of my invention shown in the drawings, Figure 1 shows a mining machine of a well known form, having as its principal elements a main frame 10, mounted on endless treads 11, and having an auxiliary frame 12 suitably mounted on the main frame for longitudinal and lateral tilting adjustments, as for instance by a plurality of jacks 13 and 14, as broadly disclosed in the pending application of James A. Robbins, Serial No. 345,157 filed March 27, 1953, owned by the assignee of this invention.

A boring head is indicated generally at 15, mounted as usual for horizontal progression into a working face of a mine. The machine may, as usual, employ two similar boring heads in side by side relation to cut contiguous bores.

Figure 2:
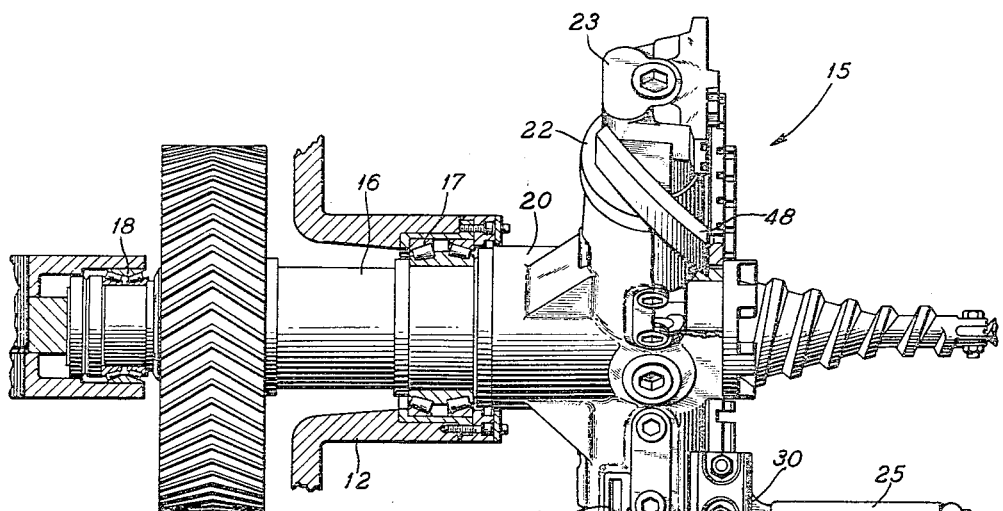
Figure 2 is an enlarged fragmentary detail section taken generally along the axis of rotation of the boring head.

Referring to Figure 2, the boring head is suitably mounted on the front end of a drive shaft 16, suitably journalled in the auxiliary or tilting frame 12 as by bearings 17, 18.

The boring head has a hub 20 fixed on shaft 16 and having a plurality of similar radial arms 21, 21, herein three in number.

Each arm 21 includes a hollow generally cylindrical inner arm portion 22 formed integral with the hub and a telescopic end portion 23. Suitable mechanism (not shown) may be mounted as usual in the hub for effecting simultaneous extension or retraction thereof of all the telescopic end portions to change the maximum working diameter of the boring head.

A plurality of cutter supports are mounted on each radial arm 21 and projecting forwardly from the latter, in the form shown herein, two such cutter supports 25 and 26 being carried on the inner arm portion 22 and a third cutter support 27 being carired at the outer end of the telescoping end portion 23. Each of such cutter supports has a cluster of cutter bits 28, suitably arranged as usual in generally arcuate relation along the front edge of each support so as to conform generally with the shape of the circular kerf to be cut by said support. Certain of the cutter supports, as for instance the inner supports 25 and 26 may also have, as usual, outwardly facing wedge or cam surfaces 29 adjacent their bases 30 for dislodging adjacent cores of material left on the working face between the cutter supports.

Figure 6:
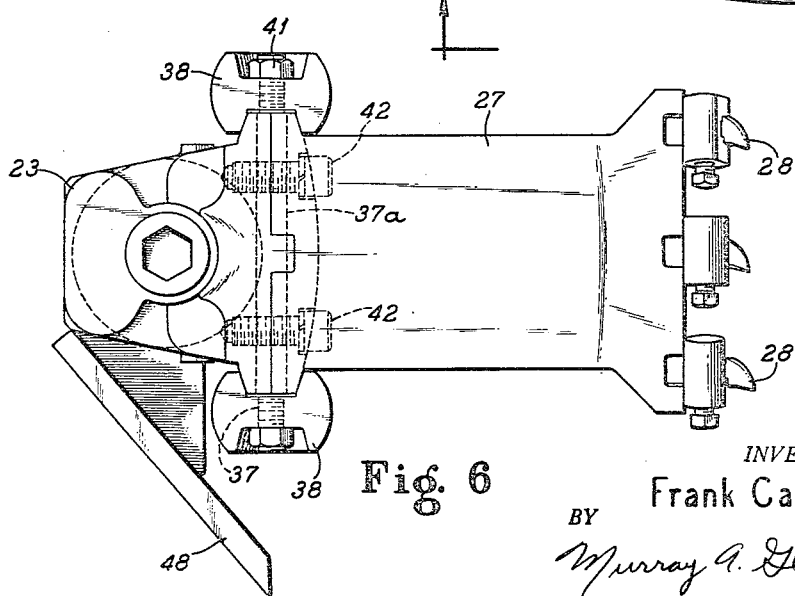
Figure 6 is an end view of one of the radial arms, with the end cutter support secured thereon.
Figure 3:
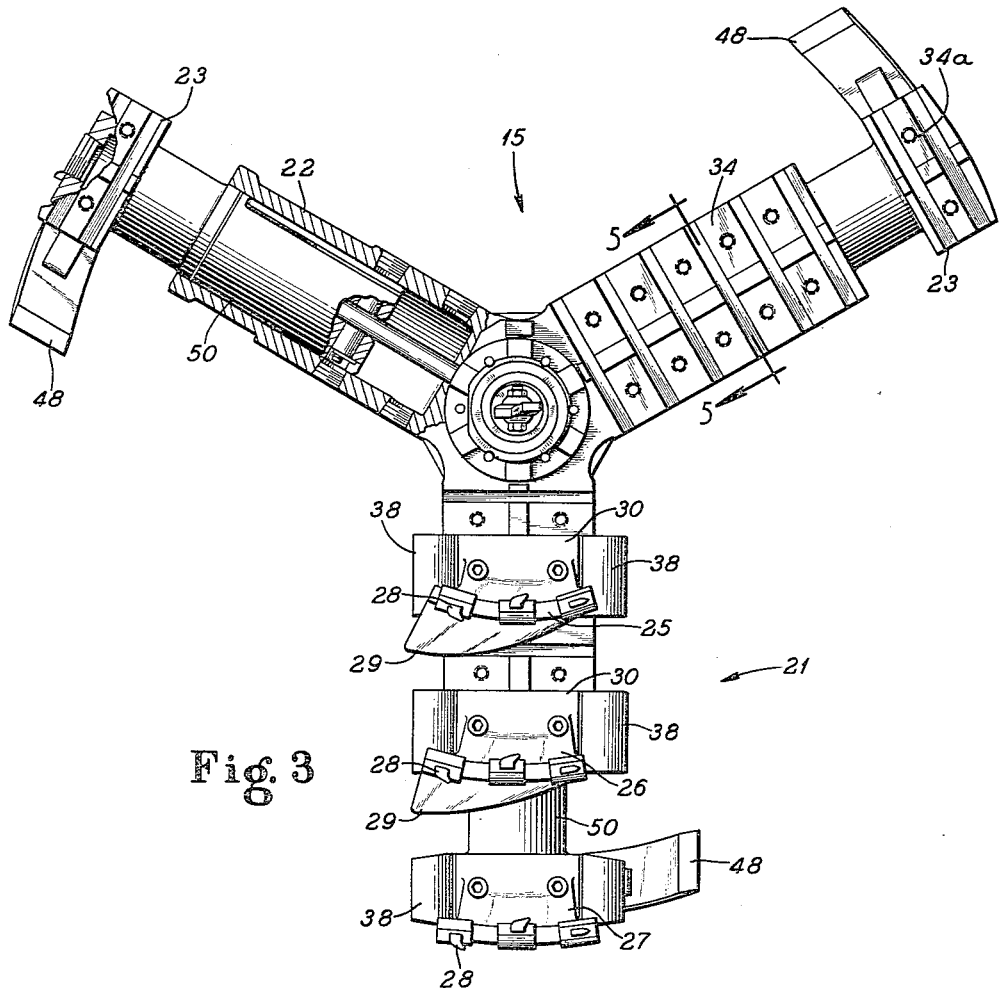
Figure 3 is a front view of the boring head shown in Figure 2, with one radial arm shown with the cutter supports mounted thereon, a second arm shown with the cutter supports removed, and the third arm shown in longitudinal section.
Figure 5:
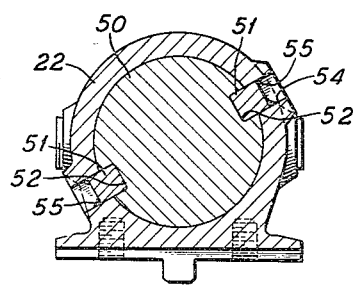
Figure 5 is a detail section taken on line 5—5 of Figure 3.
Figure 4:
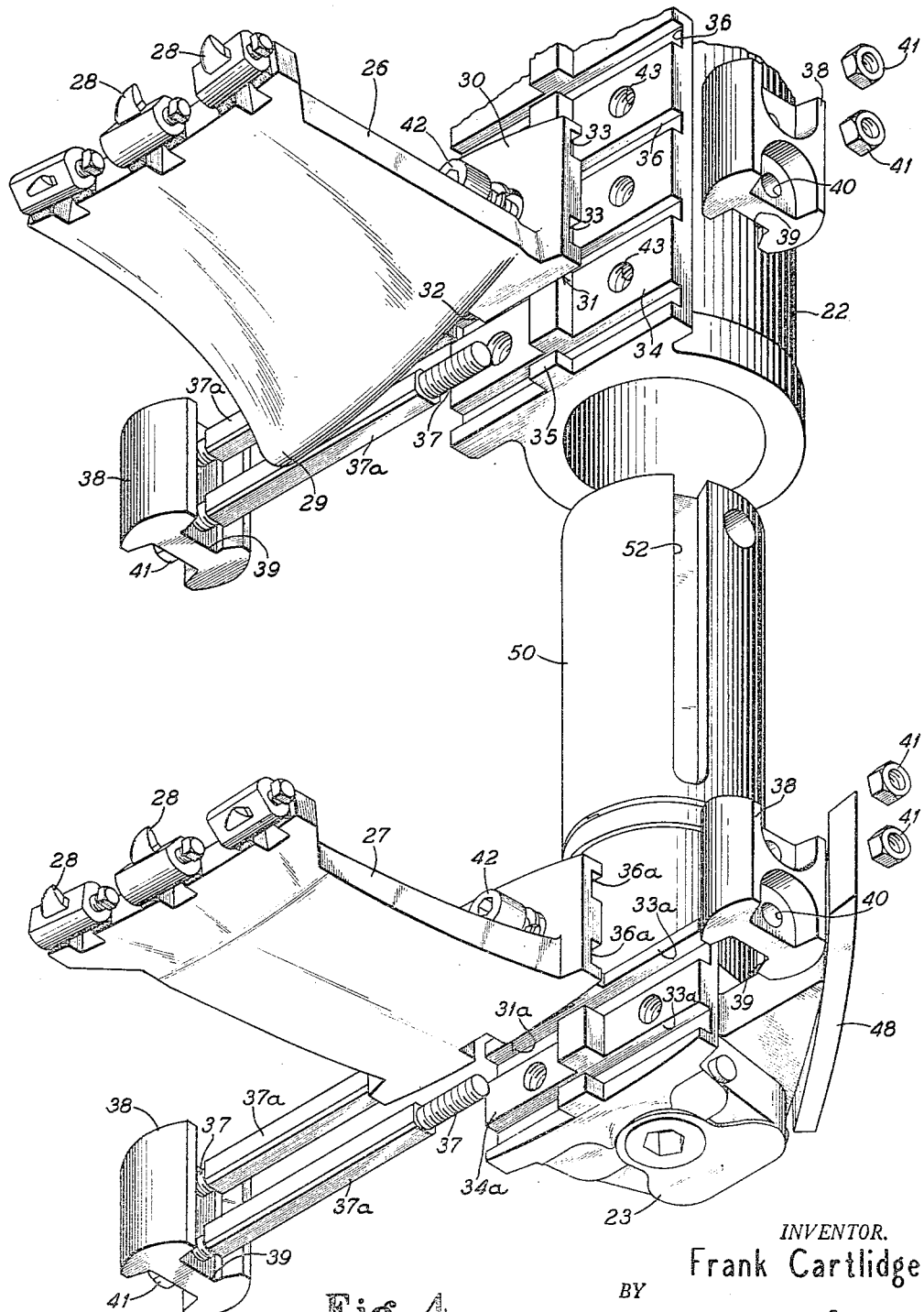
Figure 4 is an enlarged detail perspective view of one of the radial arms, with two of the cutter arm supports and their securing devices shown in detached or exploded positions.

Referring now to the detachable mountings for the cutter supports on the radial arms, Figure 4 shows details of the mountings for cutter support 26 on the inner arm portion 22 and the cutter support 27 on the telescopic arm portion 23. The cutter support 26 has a flanged base 30, the under side of which forms a generally flat bearing face 31 with a radially extending central groove 32, and two parallel transversely extending grooves 33, 33. The inner arm portion 22 has an integrally formed widened bearing face 34 extending therealong. The bearing face 31 on base 30 and the bearing face 34 on arm 22 are of the same width. The bearing face 34 on arm 22 has a radially extending rib 35, and a plurality of parallel, equally spaced grooves 36, 36 formed in its outer face. The central groove 32 on the base 30 is adapted to have a close fitting engagement over the central rib 35 on the bearing face 34 at any point along the latter. The grooves 33, 33 on the base and the grooves 36, 36 have the same width and spacing, and are preferably rectangular in cross section, so that the grooves 33 may be matched in registering relation with two grooves 36, 36 to form squared openings in any one of several positions of adjustment of the base 30 along the arm 22. In any such registered position, a pair of tie bolts 37, 37, each with central portions 37a squared in cross-section, are inserted along the pair of matching grooves 33 and 36 to prevent radial slippage of the cutter support relative to the arm portion 22. A pair of clamp bars 38, 38, are provided with channels 39 along their inner edges, which fit over the opposed side edges of the base 30 and bearing face 34. The threaded ends of the bolts 37 extend through suitably spaced apertures 40 in the clamp bars 38 and are secured to the latter by nuts 41, 41. The side walls of the channels 39 are preferably tapered outwardly to aid in drawing the base 30 and bearing face 34 together (see Figure 6).

A pair of cap screws 42, 42 may also be passed through the base 30 and secured in registering threaded holes 43, 43 formed in the bearing face 34, if desired.

A scoop or deflector plate 48 may be mounted as usual on the outer end of arm portion 23, for guiding loose material toward the conveyor of the machine.

From the above description it will now be understood that the cutter support 26 (as well as the similar support 25) is fully detachable, and can readily be adjusted radially to any desired position along the bearing face 34 on the inner arm portion 22. In all adjusted positions it will be held against circumferential slippage by the radial rib 35, and against radial slippage by the tie bars 37 in registering grooves 33 and 36.

The cutter support 27 on the telescopic outer arm portion 23 has the same type of securing means as previously described, excepting that in the form shown herein, the support 27 has no radial adjustment. Instead, the arm portion 23 has a bearing face 34a with only two transverse grooves 33a, 33a adapted to register with grooves 36a, 36a in bearing face seat 31a. In other respects, the fastening means is the same as previously described in connection with supports 25 and 26.

Referring to Figures 2 to 5, each telescopic arm portion 23 has a cylindrical part 50 which is slidably engaged in the cylindrical inner arm portion 22. Said telescoping arm portion is provided with guide means to prevent relative twisting, said guide means herein consisting of a pair of opposed ribs 51, 51 fixed along the inner surface of the inner arm portion and engaged in registering slots 52, 52 machined along its opposite sides of the cylindrical part 50 of the outer arm portion. In order to facilitate the manufacture of this type of guide means, each cylindrical arm 22 is initially formed, as by casting, with elongated slots 54, 54 opening through their side walls. The guide ribs 51, 51, formed in separate pieces, are then inserted in these slots and welded therein, preferably from the outer side of the arm, as indicated at 55, 55 in Figure 5. In this manner, the difficult and expensive machining operations otherwise required to form a circular bore and then fix longitudinal guides from the inside of the bore, is eliminated.

Although I have shown and described a preferred form of my invention, it should be understood that the disclosure is only illustrative and should not be understood to limit or confine my invention except by the appended claims.

I claim:

1. In a rotary boring head assembly having radial arms, and cutter supports detachably mounted in forwardly projecting relation on the front of said arms, said arms and said supports having opposed bearing faces of equal width, said bearing faces having a radially disposed rib and a corresponding groove formed in opposed interfitting relation to each other, said bearing faces also having a plurality of transverse matching grooves formed therein, a pair of clamping bars with inwardly facing channels adapted to have fitting engagement over the outer edges of said opposed bearing faces to hold the latter together, and tie bars having mutually interfitting engagement in said transverse matching grooves, and means for detachably securing the outer ends of said tie bars to said clamping bars.

2. The structure in accordance with claim 1, wherein the bearing face on the arm is of greater radial length and has a larger number of transverse grooves than the bearing face on the cutter support, to permit radial adjustment of the support in any one of several positions along the arm.

References Cited in the file of this patent

UNITED STATES PATENTS

| | | |
|---|---|---|
| 241,483 | Faught | May 17, 1881 |
| 1,094,442 | Hoerr | Apr. 28, 1914 |
| 2,587,065 | Robbins | Feb. 26, 1952 |
| 2,654,610 | De Ulieg | Oct. 6, 1953 |
| 2,680,034 | Robbins | June 1, 1954 |
| 2,695,504 | Magee | Nov. 30, 1954 |